A. R. KELLER.
MASH AND STRAINER TANK MACHINE.
APPLICATION FILED JUNE 25, 1914.
1,166,599.
Patented Jan. 4, 1916.
3 SHEETS—SHEET 1.
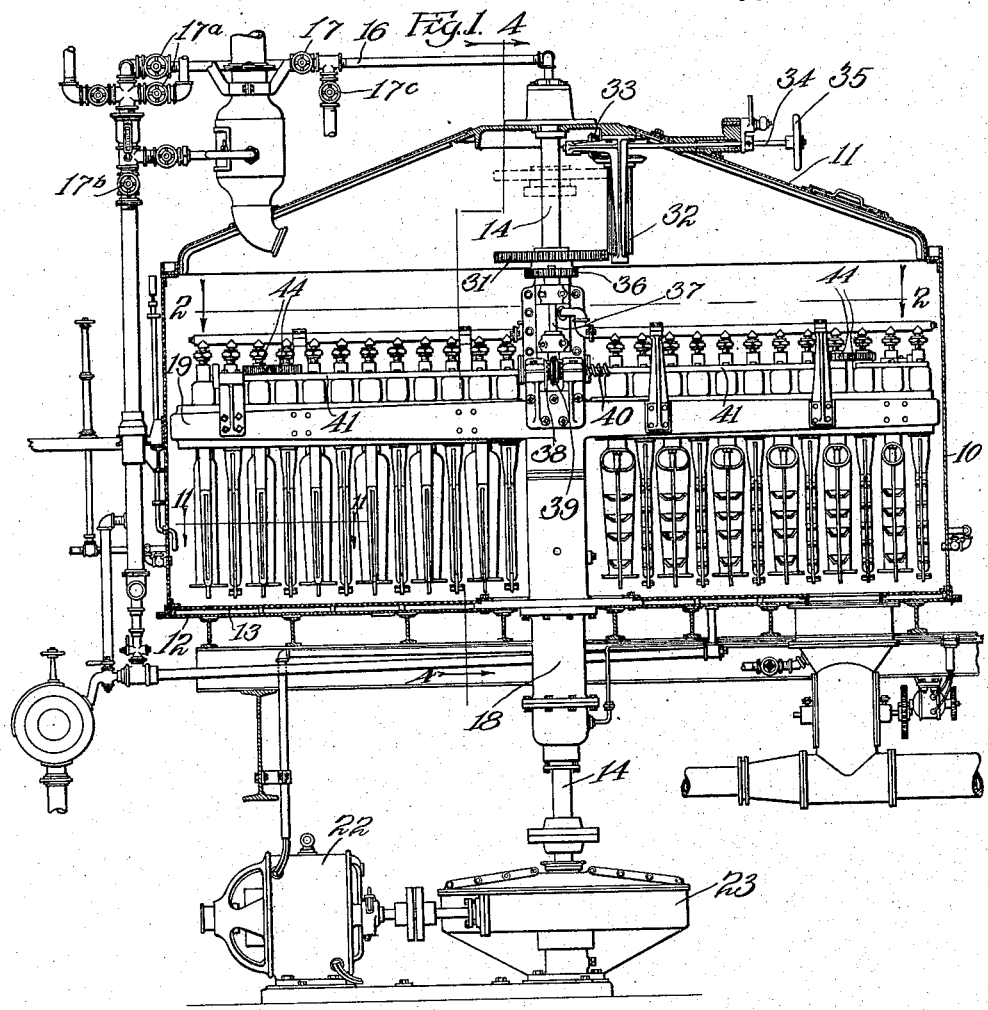
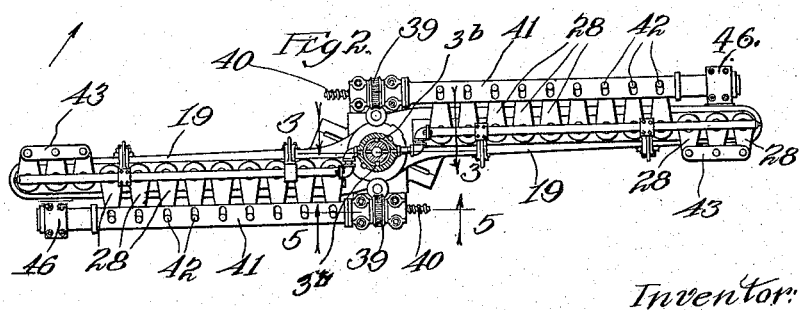

A. R. KELLER.
MASH AND STRAINER TANK MACHINE.
APPLICATION FILED JUNE 25, 1914.

1,166,599.

Patented Jan. 4, 1916.
3 SHEETS—SHEET 2.

Witnesses:
Leo J. Dumais.
Arthur B. Framke.

Inventor
Andreas R. Keller
by Robt. Klotz Atty.

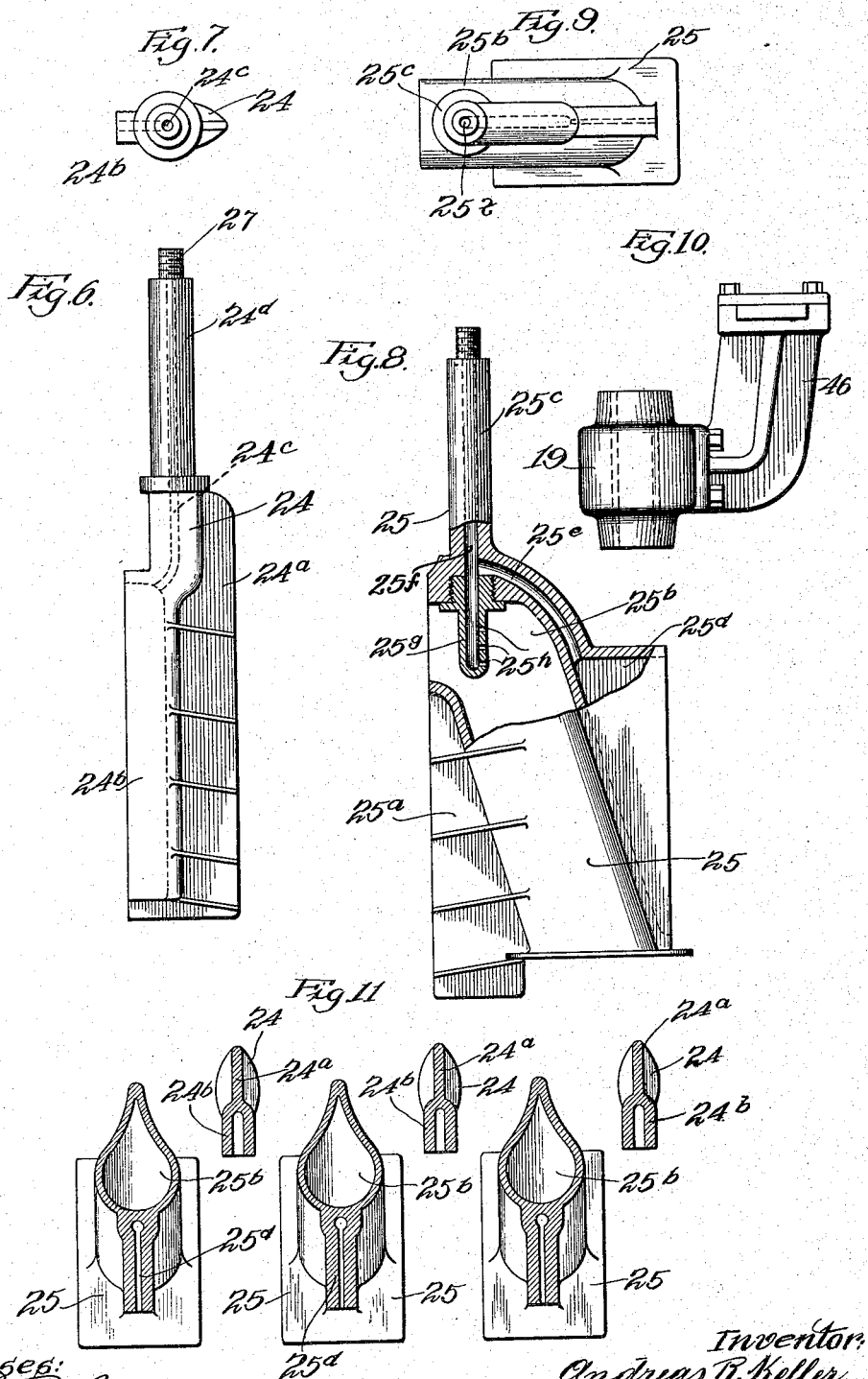

UNITED STATES PATENT OFFICE.

ANDREAS R. KELLER, OF CHICAGO, ILLINOIS.

MASH AND STRAINER TANK MACHINE.

1,166,599. Specification of Letters Patent. Patented Jan. 4, 1916.

Application filed June 25, 1914. Serial No. 847,175.

*To all whom it may concern:*

Be it known that I, ANDREAS REINHARD KELLER, a citizen of the United States, residing in the city of Chicago, county of Cook, and State of Illinois, have invented certain new and useful Improvements in Mash and Strainer Tank Machines, of which the following is a specification.

This invention relates to new and useful improvements in mash and strainer tank machines, and is designed to increase the efficiency of such machines by improving the mixing, percolation, heating or cooking, straining, and drawing-off features, thereby overcoming the predominant and objectionable disadvantages of the machines now in use.

With the above and other objects in view, as will be hereinafter apparent, this invention consists in the construction, combination and arrangement of parts all as hereinafter more fully described, claimed and illustrated in the accompanying drawings, wherein,—

Figure 3:
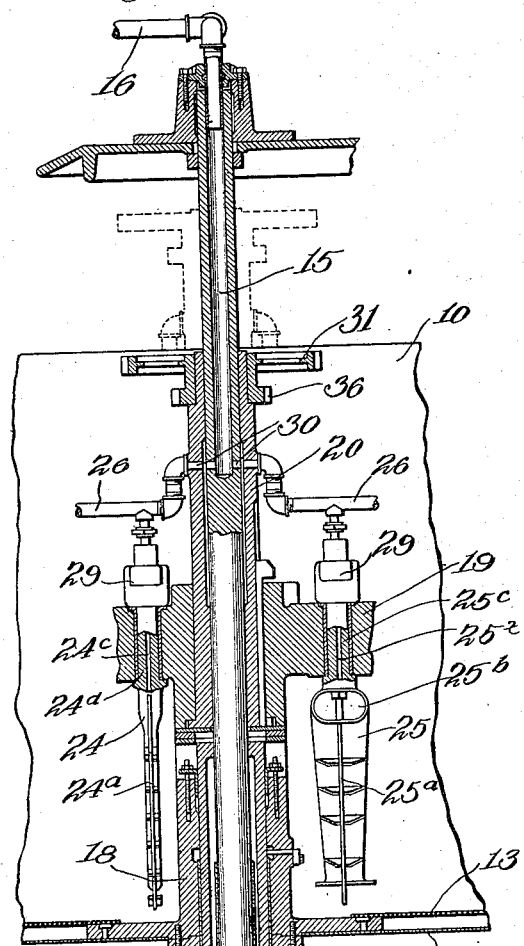
Figure 4:
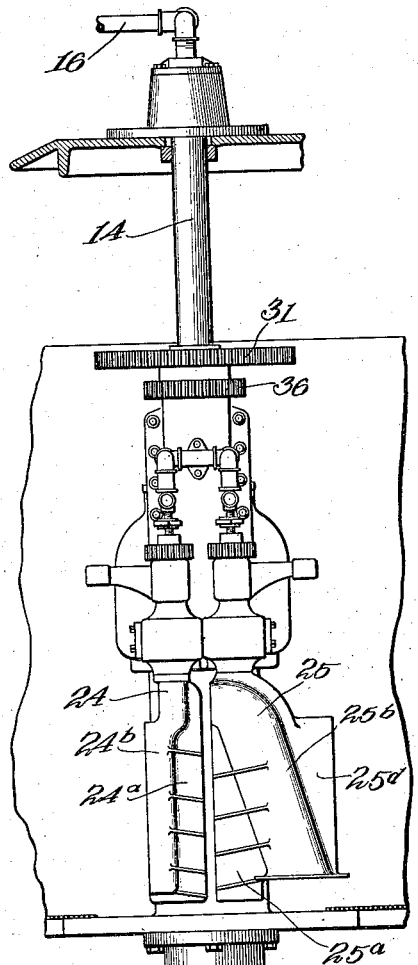
Figure 5:
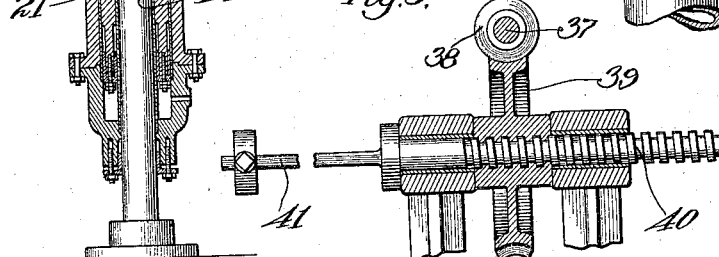

Figure 1 is a central vertical section of the machine forming the subject-matter of the present invention; Fig. 2 is a horizontal sectional view, taken along line 2—2 of Fig. 1, illustrating the adjustment of the deflectors and blade intersprinklers; Fig. 3 is a sectional view along line 3—3 of Fig. 2, and illustrates the hydraulic raising and lowering mechanism for the tank; Fig. 4 is a sectional view along the line 4—4 of Fig. 1, and illustrates the relative positioning of the deflectors and blade in the sprinklers; Fig. 5 is a vertical section taken on line 5—5 of Fig. 2, and illustrates the mechanism for the adjustment of the deflectors and blade in the sprinklers; Fig. 6 is a detail elevation of one of the deflectors or agitators; Fig. 7 is a top plan view thereof; Fig. 8 is a side elevation, partly in section, of one of the blade intersprinklers or agitators; Fig. 9 is a top plan view thereof; Fig. 10 is a vertical elevation of one of the brackets whereby the adjustment mechanism for the agitators is supported, the same being an end elevation of the supporting frame for the agitators, showing the bracket coöperating therewith; Fig. 11 is a horizontal section taken along the line 11—11 of Fig. 1, and illustrates the correlation between the deflectors and the blade intersprinklers or agitators.

To fully understand the present invention, it is essential to appreciate the mash and strainer tank machines which have heretofore been in use, so that the fallacies of design and the disadvantages thereof which have been overcome may be appreciated. Heretofore, a tun or vessel having rotating shovels and revolving mixers mounted therein, and bottom discharge outlets for the wort, has been used, the wort filtering through a strainer or false bottom in the vessel or tun. This type of mash and strainer machine is defective in that it fails to extract all of the sugar and other beer-making ingredients from the grain. This is due to the fact that the heavier grain used in brewing beer settles to the bottom of the vessel or tun, the wort remaining at the top, thus preventing the mixture from being properly roiled in order to bring all of the grain into an intimate mixture with all of the wort. The settling of the grain to the bottom of the vessel or tank causes the strainer or false bottom in the vessel or tun to be clogged, preventing the desirable rapid discharge of the wort from the vessel. Furthermore, the machine now in use has other and prominent defects which are overcome by the present invention. Among these is the formation and filtering of glutinous parts of the grain through the false bottom and into the drain space thereunder, which is known as "underdough". This "underdough" hardens in the drain space, and also prevents the proper draining of the wort from the tank. This formation of the "underdough" is primarily caused by the movement of the revolving mixers, which by their movement compress the grain sufficiently to force the small glutinous parts therefrom. The gearing of the machine now in use has been submerged in the wort or mixture, and during its operation grinds the grain to such a fineness which, combined with the meal already in the grain due to its first grinding, forms a glutinous film or "upperdough" between the wort and the grain, which not only prevents the proper mixture between the wort and the grain, but also retards the outflow of the wort to such an extent that at times it is necessary to syphon the wort from the tank at the top thereof. These and many other difficulties abound in the machine now in use, and the present invention is primarily designed to overcome these difficulties or objections, thereby increasing the efficiency of the machine, bettering the product thereof, and facilitating the discharge of the wort.

Reference being had more particularly to the drawings, 10 designates generally the tun or vessel in which the apparatus forming the subject-matter of the present invention is mounted, said tun being provided with a top 11 and a bottom 12. A false bottom 13 is superposed above the main bottom 12 and is provided with a series of perforations or drain openings, while the main bottom 12 is imperforate. A shaft 14 extends through the tun or vessel 10 and is provided with a passage 15 at its upper terminal. This passage 15 connects with the pipe 16 which extends through the top 11 of the vessel, and feeds warm or heated water or steam to the passage 15, said steam or water being controlled by the valves 17, $17^a$, $17^b$, $17^c$. Cold water may also be passed through the pipe 16 to the passage 15 in the shaft 14.

A casing 18 surrounds the lower terminal of the shaft 14 and extends through the bottoms 12 and 13 of the tun or vessel 10. A frame 19 is also mounted on the shaft 14 at the upper terminal of the casing 18, through the instrumentality of a sleeve 20 which is keyed to said frame 19. A hydraulic piston 21 is mounted in the casing and operates against the lower terminal of the sleeve 20, so that when the piston is raised the sleeve 20 will likewise be raised, and the frame 19 therewith. The shaft 14 is rotated from the motor 22 through the medium of bevel gears (not shown) mounted in the casing 23. This rotation of the shaft is imparted to the sleeve through suitable connecting means such as a key $3^b$ shown in Fig. 2 and through the sleeve 20 to the frame 19 carrying said frame and said sleeve about the shaft, at the same time permitting of an adjustment between the shaft and said frame and sleeve. The position of the frame may be adjusted with respect to the shaft by means of the hydraulic piston 21 to raise and lower the agitators which are carried by the frame, into and out of the mash within the tun or vessel 10. This hydraulic piston is operated by any suitable and standard hydraulic mechanism which forms no part of the present invention and which for that reason is not illustrated or described.

Carried by the frame 19 and extending vertically below the same are a series of deflectors and blade agitators or intersprinklers both of which are known generally as agitators. There are two types of agitators used in the present invention, one of which is a blade agitator 24, and the other of which is what might be termed a cylindrical agitator 25. Both of these agitators act as injectors, forcing hot or cold water or steam through the mash, and are so arranged in the frame 19 that the fluid is ejected in substantially the same direction. These agitators are also alternately arranged in the frame 19, upon each side of the shaft 14, as illustrated in Fig. 11. The blade agitators 24 comprise a web $24^a$, which carries an outlet or injector extension $24^b$, which is connected by a passage $24^c$ which extends through the shank $24^d$ to the supply pipe 26. This shank extends through the frame 19 and is connected by the threads 27 to the adjustment bar (to be described), by means of the crank 28, all of the agitators being provided with such cranks, as illustrated in Fig. 2. The upper end of the shank $24^b$ connects with the casing 29, which in turn is connected in any suitable manner with the supply pipe. The cylindrical agitator comprises a web $25^a$, which carries a cylinder $25^b$, said cylinder being obliquely arranged to the shank $25^c$ of the agitator. This cylinder carries, or has formed thereon, an outlet or injector extension $25^d$, which is connected by a feed passage $25^e$ to the passage $25^f$ in the shank $25^c$. This shank extends through the frame 19 and through the medium of the casing 29 is connected to the supply pipe 26, there being two of these supply pipes, one on each side of the shaft 14. The agitators 25 are also provided with the cranks 28, whereby their position with respect to the frame 19 is adjusted. The passage $25^f$ connects with a nipple $25^g$ located within the upper terminal of the cylinder, said nipple being provided with perforations $25^h$. By this construction the fluid is fed not only through the passage $25^e$ to the sprinkler $25^d$ but also passes into the nipple $25^g$ and through the perforations $25^h$. Therefore, a supply of fluid is fed through the cylinder $25^b$ and agitates and mixes the matter on the bottom of the tank.

Water, hot or cold, or steam or any other desirable fluid, passes from the supply pipe 16 to the passage 15 in the shaft 14, through the horizontal passages 30 extending through the sleeve 20 and shaft, and into the spargers or pipes 26. The fluid is then fed into the shafts $24^d$ and $25^c$ of the agitators 24 and 25, respectively, and from these agitators is ejected into the mash surrounding the same.

A gear 31 is loosely mounted upon the sleeve 20 at its upper terminal, and meshes with a barrel gear 32. This barrel gear meshes with the bevel gear 33 carried by a shaft 34, having a hand wheel 35 at its terminal. Mounted on the same hub as the gear 31 is a second gear 36, which meshes upon each side thereof with gears carried by the shafts 37. These shafts at their lower terminals are provided with the worm gears 38 (Figs. 1 and 5), which in turn mesh with the gears 39. Each of these gears 39 coöperates with a worm 40, which is moved through the gears 39 by the rotation of the latter. The worm 39 has a rod or adjustment bar 41 formed therewith, which extends over the crank 28 of the adjuster of one side of the frame 19, and has a pin and slot connection 42 with said cranks. When the hand wheel 35 is rotated, it is obvious that the gears 31 and 36 are consequently rotated, resulting in the rotation of the gears 39. These gears 39 are also connected to the worms 40, which causes said worms to pass through said gears, moving the adjustment bars 41 in either direction. This longitudinal movement of the adjustment bars 41 causes all of the agitators connected therewith to be swung in either direction, thus adjusting the angularity thereof. The last three agitators on each end of the frame have their cranks connected together by the links 43. A pair of gears 44 connect each link 43 to its adjacent adjustment rod 41, so that when the adjustment rod is moved longitudinally, the links 43 and their coöperating cranks 28 and agitators will be adjusted in the opposite direction to the adjustment of the agitators connected to the adjustment rods or bars 41.

From the foregoing it will be apparent that upon the operation of the motor 22, the frame 19 will be rotated within the tank to positively agitate the mash therein and eject fluid into the same.

The outer terminals of the bars 41 reciprocate in the brackets 46 secured to the end of the frame 19.

What is claimed is:

1. In a machine of the class described, a tank, a vertical rotary shaft in said tank, a horizontal frame mounted on said shaft, and rotatable in unison with said shaft, said frame being vertically adjustable longitudinally of said shaft, hydraulic mechanism for adjusting said frame, said frame including a central sleeve through which the vertical shaft passes, and horizontal arms extending therefrom in opposite directions and in slightly different but parallel planes, a series of agitators hung from said arms; each of said agitators being provided with a passage for fluid, an adjustment bar extending parallel with one arm, cranks extending from the agitators and connecting to the said adjusting bar, a second adjustment bar extending parallel with the other arm, cranks extending from the agitators of said arm and connecting to said second adjustment bar, said adjustment bars being located on opposite sides of the arms and being entirely independent of each other, means for moving said arms lengthwise to adjust the agitators, and means for supplying fluid to the passages in said agitators irrespective of the adjustment of the agitators.

2. In a machine of the class described, a tank, a vertical rotary shaft in said tank, a horizontal frame mounted on said shaft, and rotatable in unison with said shaft, said frame being vertically adjustable longitudinally of said shaft, said frame including a central sleeve through which the vertical shaft passes, and horizontal arms extending therefrom in opposite directions and in slightly different but parallel planes, a series of agitators hung from said arms, an adjustment bar extending parallel with one arm, cranks extending from the agitators and connecting to the said adjusting bar, a second adjustment bar extending parallel with the other arm, cranks extending from the agitators of said arm and connecting to said second adjustment bar, said adjustment bars being located on opposite sides of the arms and being entirely independent of each other and means for moving said arms lengthwise to adjust the agitators.

3. In a machine of the class described, a tank, a vertical rotary shaft in said tank, a horizontal frame mounted on said shaft, and rotatable in unison with said shaft, said frame being vertically adjustable longitudinally of said shaft, said frame including a central sleeve through which the vertical shaft passes, and horizontal arms extending therefrom in opposite directions and in slightly different but parallel planes, a series of agitators hung from said arms, an adjustment bar extending parallel with one arm, cranks extending from the agitators and connecting to the said adjusting bar, a second adjustment bar extending parallel with the other arm, cranks extending from the agitators of said arm and connecting to said second adjustment bar, said adjustment bars being located on opposite sides of the arms and being entirely independent of each other and screw means for moving said arms lengthwise to adjust the agitators.

4. In a machine of the class described, a tank, a vertical rotary shaft in said tank, a horizontal frame mounted on said shaft and rotatable in unison with said shaft, said frame being vertically adjustable longitudinally of said shaft, said frame including a central sleeve through which the vertical shaft slidably fits, and horizontal arms extending therefrom in opposite directions and in slightly different but parallel planes, a series of agitators hung from each of said arms, an adjustment bar extending parallel with each arm, cranks extending from the agitators and connecting to the adjusting bars, and two manually operated screws located at the inner end of the adjusting bars and adjacent to and on opposite sides of the sleeve for longitudinally adjusting said bars, said adjustment bars and adjusting screws being independent of each other.

5. The combination with a tank of a shaft concentrically arranged therein, having a water feed passage in its upper terminal, a sleeve keyed to and slidable upon said shaft, a casing surrounding said shaft, a hydraulic piston within said casing and arranged to act upon said sleeve for moving the latter longitudinally upon said shaft, a frame keyed to said sleeve, a series of agitators mounted on said frame adapted to act as injectors, supply pipes extending from said sleeve and connected with said agitators, said sleeve having connections with the water feed passage of the shaft, and means for rotating the shaft and sleeve thereby rotating said frame within the tank.

6. In a machine of the class described, a tank, a vertical rotary shaft within said tank, a sleeve slidably mounted on said shaft, two oppositely-extending arms supported from said sleeve, a series of agitators depending from each arm, and means for simultaneously adjusting all of said agitators on each arm.

7. In a machine of the class described, a tank, a vertical rotary shaft in said tank, a horizontal frame mounted on said shaft, and rotatable in unison with said shaft, said frame being vertically adjustable longitudinally of said shaft, said frame including a central sleeve through which the vertical shaft passes, and horizontal arms extending therefrom in opposite directions and in slightly different but parallel planes, a series of agitators hung from said arms; each of said agitators being provided with a passage for fluid, an adjustment bar extending parallel with one arm, cranks extending from the agitators and connecting to the said adjusting bar, a second adjustment bar extending parallel with the other arm, cranks extending from the agitators of said arm and connecting to said second adjustment bar, said adjustment bars being located on opposite sides of the arms and being entirely independent of each other, means for moving said arms lengthwise to adjust the agitators, and means for supplying fluid to the passages in said agitators irrespective of the adjustment of the agitators.

In testimony whereof I have hereunto affixed my name in the presence of two witnesses.

ANDREAS R. KELLER.

Witnesses:
F. E. MOFFETT,
WALTER H. LANGHOFF.

Copies of this patent may be obtained for five cents each, by addressing the "Commissioner of Patents, Washington, D. C."